(12) United States Patent
Pathiyal et al.

(10) Patent No.: US 7,534,060 B2
(45) Date of Patent: May 19, 2009

(54) KEYPAD AND HANDHELD ELECTRONIC DEVICE

(75) Inventors: Krishna K. Pathiyal, Waterloo (CA); Jason Griffin, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 524 days.

(21) Appl. No.: 11/223,777

(22) Filed: Sep. 9, 2005

(65) Prior Publication Data

US 2006/0055566 A1 Mar. 16, 2006

Related U.S. Application Data

(60) Provisional application No. 60/609,147, filed on Sep. 10, 2004.

(51) Int. Cl.
*G06F 3/023* (2006.01)
*B41J 5/10* (2006.01)
(52) U.S. Cl. ...................... 400/486; 400/489
(58) Field of Classification Search ........................ None
See application file for complete search history.

(56) References Cited

U.S. PATENT DOCUMENTS

| 6,295,052 | B1 * | 9/2001 | Kato et al. ................. 345/179 |
| 7,091,885 | B2 * | 8/2006 | Fux et al. ...................... 341/22 |
| 7,109,973 | B2 * | 9/2006 | Fyke et al. .................. 345/169 |
| 2001/0006587 | A1 | 7/2001 | Keinonen et al. |
| 2004/0165924 | A1 | 8/2004 | Griffin et al. |
| 2005/0184963 | A1 * | 8/2005 | Fyke .......................... 345/168 |
| 2005/0237228 | A1 * | 10/2005 | Salman et al. ............... 341/22 |

FOREIGN PATENT DOCUMENTS

| GB | 2434237 A | | 7/2007 |
| JP | 2000035857 A | * | 2/2000 |
| JP | 2003015808 A | * | 1/2003 |
| WO | WO 01/49503 | | 7/2001 |
| WO | WO 03056784 A2 | * | 7/2003 |
| WO | WO 03/085505 | | 10/2003 |

* cited by examiner

*Primary Examiner*—Daniel J Colilla
(74) *Attorney, Agent, or Firm*—Brij K. Agarwal; Eckert Seamans Cherin & Mellott, LLC

(57) ABSTRACT

An improved keypad having a plurality of keys can have linguistic elements assigned to the keys in any of a variety of arrangements depending upon various considerations.

3 Claims, 4 Drawing Sheets

KEYPAD AND HANDHELD ELECTRONIC DEVICE

CROSS-REFERENCE TO RELATED APPLICATION

The instant application claims priority from U.S. Provisional Patent Application Ser. No. 60/609,147 filed Sep. 10, 2004, the disclosures of which are incorporated herein by reference.

BACKGROUND OF THE INVENTION

1. Field of the Invention

The invention relates generally to handheld electronic devices and, more particularly, to a keypad suitable for use on a handheld electronic device and a resultant handheld electronic device.

2. Background of the Invention

Numerous types of handheld electronic devices are known. Examples of such handheld electronic devices include, for instance, personal data assistants (PDAs), handheld computers, two-way pagers, cellular telephones, and the like. Such handheld electronic devices are generally intended to be portable, and thus are relatively small. Many handheld electronic devices also features wireless communication capability, although many such handheld electronic devices are stand-alone devices that are functional without communication with other devices. With advances in technology, handheld electronic devices are being configured to include greater numbers of features while having relatively smaller form factors.

Such handheld electronic devices are generally intended to be portable, and thus are of a relatively compact configuration in which keys and other input structures often perform multiple functions under certain circumstances or may otherwise have multiple aspects or features assigned thereto. With advances in technology, handheld electronic devices are built to have progressively smaller form factors yet have progressively greater numbers of applications and features resident thereon. As a practical matter, the keys of a keypad can only be reduced to a certain small size before the keys become relatively unusable. In order to enable text entry, however, a keypad must be capable of entering all twenty-six letters of the Roman alphabet, for instance, as well as appropriate punctuation and other symbols, and/or other linguistic elements.

One way of providing numerous letters in a small space has been to provide a "reduced keyboard" in which multiple letters, symbols, and/or digits, and the like, are assigned to any given key. For example, a touch-tone telephone includes a reduced keypad by providing twelve keys, of which ten have digits thereon, and of these ten keys eight have Roman letters assigned thereto. For instance, one of the keys includes the digit "2" as well as the letters "A", "B", and "C". Other known reduced keyboards have included other arrangements of keys, letters, symbols, digits, and the like. Since a single actuation of such a key potentially could be intended by the user to refer to any of the letters "A", "B", and "C", and potentially could also be intended to refer to the digit "2", the input generally is an ambiguous input and is in need of some type of disambiguation in order to be useful for text entry purposes.

In order to enable a user to make use of the multiple letters, digits, and the like on any given key, numerous keystroke interpretation systems have been provided. For instance, a "multi-tap" system allows a user to substantially unambiguously specify a particular character on a key by pressing the same key a number of times equivalent to the position of the desired character on the key. For example, on the aforementioned telephone key that includes the letters "ABC", and the user desires to specify the letter "C", the user will press the key three times. While such multi-tap systems have been generally effective for their intended purposes, they nevertheless can require a relatively large number of key inputs compared with the number of characters that ultimately are output.

Another exemplary keystroke interpretation system would include key chording, of which various types exist. For instance, a particular character can be entered by pressing two keys in succession or by pressing and holding first key while pressing a second key. Still another exemplary keystroke interpretation system would be a "press-and-hold/press-and-release" interpretation function in which a given key provides a first result if the key is pressed and immediately released, and provides a second result if the key is pressed and held for a short period of time. While they systems have likewise been generally effective for their intended purposes, such systems also have their own unique drawbacks.

Another keystroke interpretation system that has been employed is a software-based text disambiguation function. In such a system, a user typically presses keys to which one or more characters have been assigned, generally pressing each key one time for each desired letter, and the disambiguation software attempts to predict the intended input. Numerous such systems have been proposed, and while many have been generally effective for their intended purposes, shortcomings still exist.

It would be desirable to provide an improved keypad and a resulting handheld electronic device, with the keypad including a plurality of keys to which one or more linguistic elements are assigned, and with the linguistic elements being assigned to the keys in any of a variety of desirable arrangements.

BRIEF DESCRIPTION OF THE DRAWINGS

A full understanding of the invention can be gained from the following Description of the Preferred Embodiment when read in conjunction with the accompanying drawings in which.

Similar numerals refer to similar parts to the specification.

DESCRIPTION OF THE PREFERRED EMBODIMENT

Figure 1:
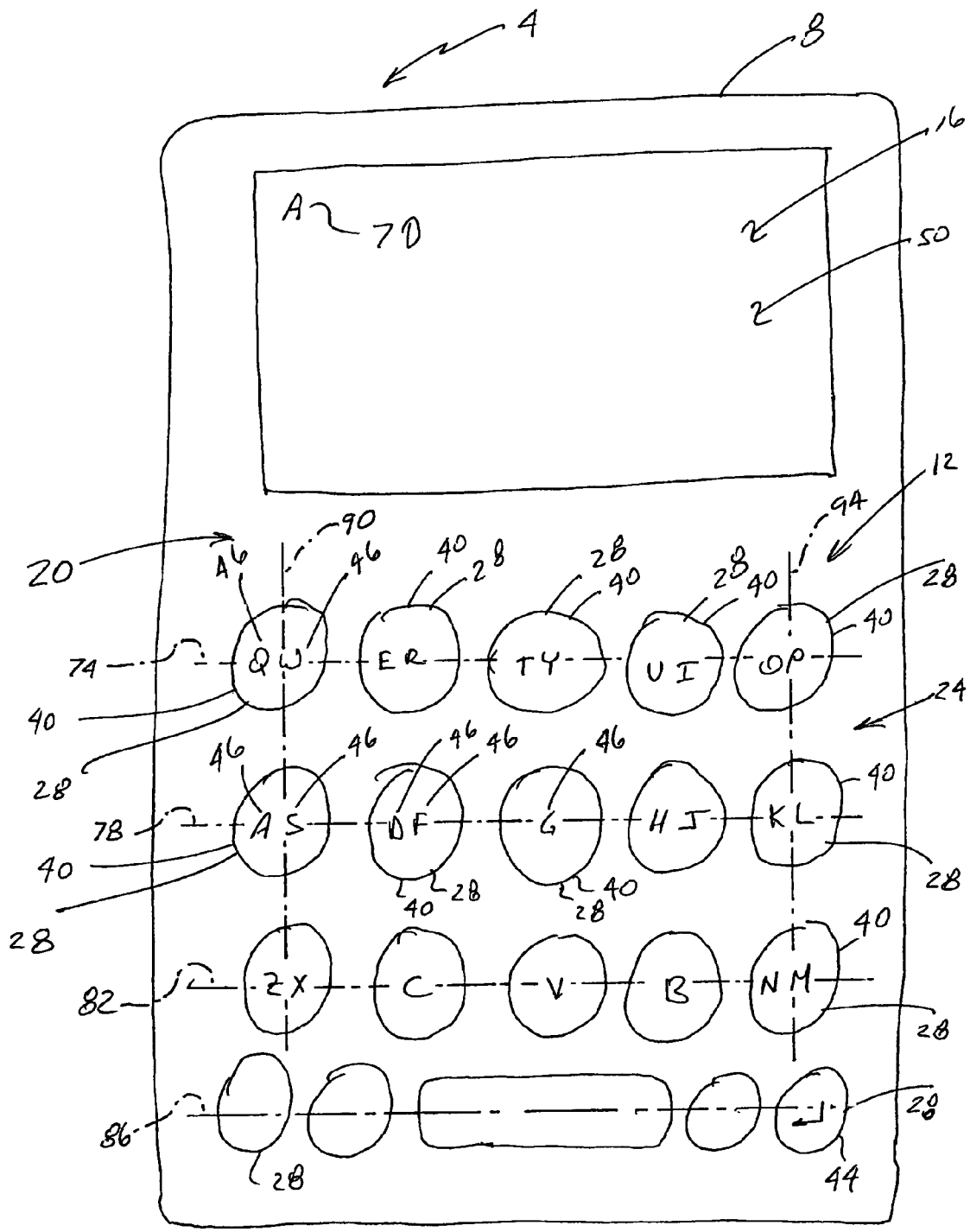
FIG. 1 is an exemplary top plan view of a handheld electronic device in accordance with the invention including a keypad in accordance with the invention having a plurality of linguistic elements assigned thereto.
Figure 2:
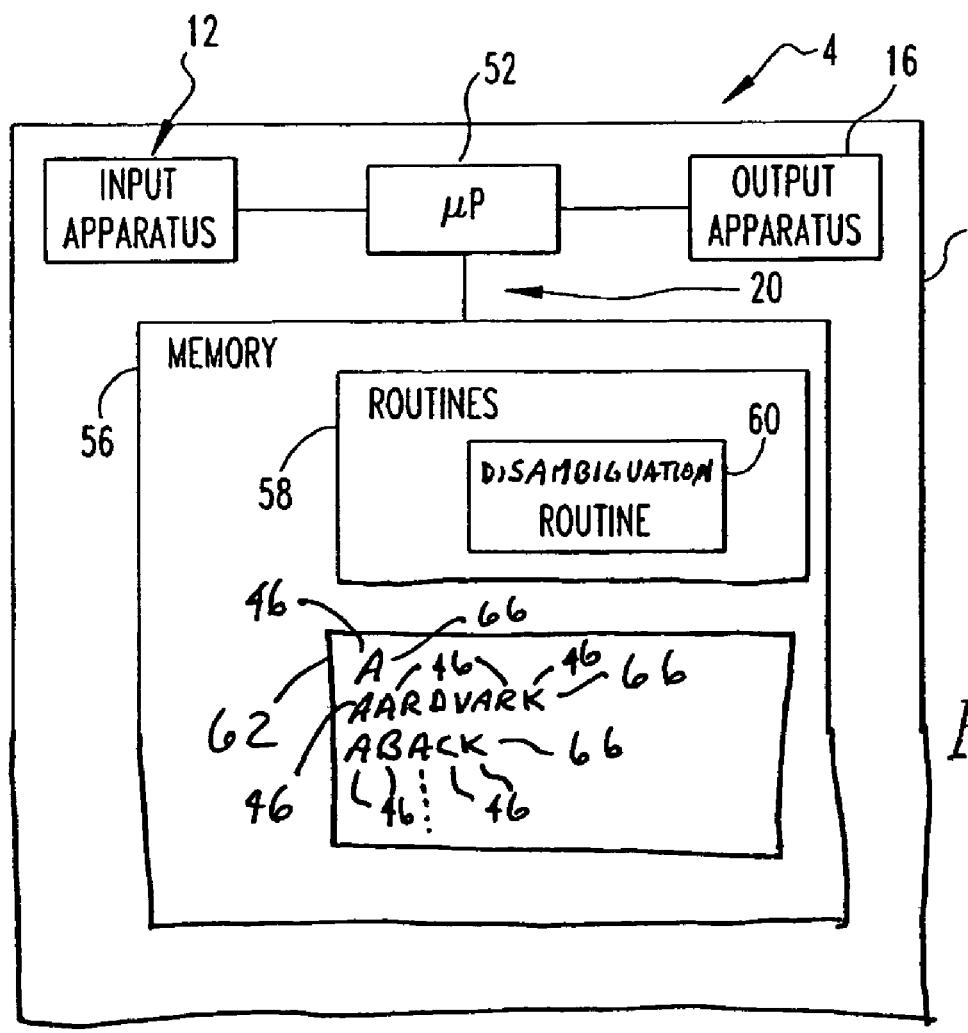
FIG. 2 is a schematic view of the handheld electronic device of FIG. 1.

An improved handheld electronic device 4 in accordance with the invention is indicated generally in FIG. 1 and is depicted schematically in FIG. 2. The exemplary handheld electronic device 4 includes a housing 8 upon which are disposed an input apparatus 12, an output apparatus 16 and a processor apparatus 20. The input apparatus 12 includes a keypad 24 that can be said to include a plurality of keys 28. The keys 28 include a plurality of alphanumeric keys 40 and a <FUNCTION> key 44.

In the accompanying figures only a single <FUNCTION> key 44 is expressly depicted, and the exemplary depicted <FUNCTION> key 44 is a <CARRIAGE RETURN> key. It is understood, however, that the keypad 24 may include other and/or additional <FUNCTION> keys 44, such as, for example, a backspace key, an alt key, a shift key, a delete key, and/or any of a variety of other <FUNCTION> keys 44.

Many of the keys 28 include one or more linguistic elements 46 assigned thereto, and many of the keys 28 each include a plurality of the linguistic elements 46 assigned thereto. While in the accompanying figures the linguistic elements 46 are depicted as Roman letters, it is understood that the linguistic elements 46 could be other characters, ideograms, or other elements which, when input into the handheld electronic device 4, enable a person to provide linguistic input into the handheld electronic device 4. While the exemplary <FUNCTION> key 44 is depicted as not including a linguistic element 46 assigned thereto, it is understood that the <FUNCTION> key 44 could include one or more linguistic elements 46 without departing from the concept of the invention.

The output apparatus 16 includes a display 50. The output apparatus 60 can additionally include, for instance, additional indicators such as lights, and the like, and can additionally include an audible output such as a speaker as well as other output devices.

The processor apparatus 20 includes a processor 52 that can be, for instance, and without limitation, a microprocessor (pP), and it is responsive to inputs from the input apparatus 12 and provides output signals to the output apparatus 16. The processor apparatus 20 further includes a memory 56 that includes a number of routines 58 and a corpus 62 stored thereon. As employed herein, the expression "a number of" and variations thereof shall refer broadly to any nonzero quantity including a quantity of one. The processor 52 interfaces with the memory 56, and the routines 58 are executable on the processor 52.

The routines 58 include, among other routines, a disambiguation routine 60. The disambiguation routine 60 can, for example, and in response to an actuation by a user of one or more keys 28 having one or more linguistic elements 46 assigned thereto, output to the output apparatus 16 a proposed output of a number of linguistic elements 46 from among the linguistic elements 46 assigned to the number of actuated keys 28 as a disambiguated interpretation of an intent of the user in providing the input. In FIG. 1, an exemplary output 70 of the letter "A" on the display 50 may, for instance, be provided to the output apparatus 16 by the disambiguation routine 60 in response to an actuation of the key 28 to which are assigned the linguistic elements 46 "AS".

The corpus 62 includes a plurality of linguistic members 66 stored therein, with the linguistic members 66 generally each comprising a number of linguistic elements 46. While the exemplary linguistic members 66 are depicted as being words in the English language, it is understood that the linguistic members 66 could additionally or alternatively include linguistic members 66 in other languages and/or that may be made up of different linguistic elements 46. Moreover, while the linguistic elements 46 assigned to the keys 28 are generally the same linguistic elements 46 from which the linguistic members 66 are formed, it is understood that the corpus 62 may alternatively or additionally include linguistic members 66 that are formed, in whole or in part, of one or more linguistic elements that are not assigned to the keys 28.

On the exemplary handheld electronic device 4 the keys 28 of the keypad 24 are laid out to be in a first row 74, a second row 78, a third row 82, and a fourth row 86. The exemplary first, second, third, and fourth rows 74, 78, 82, and 86 each extend generally in a horizontal direction with respect to FIG. 1 and are generally each linear and generally are parallel with one another. It is understood, however, that in other embodiments the first, second, third, and fourth rows 74, 78, 82, and 86 may be of other configurations without departing from the concept of the invention.

The keys 28 can also be said to be laid out in a number of columns including a first column 90 disposed generally at one side of the handheld electronic device 4 and a second column 94 disposed at a second side of the handheld electronic device 4. The first and second columns 90 and 94 each extend generally in a vertical direction with respect to FIG. 1 and are generally each linear and generally are parallel with one another. It is understood, however, that in other embodiments the first and second columns 90 and 94 may be of other configurations without departing from the concept of the invention.

On the exemplary handheld electronic device 4, the first, second, third, and fourth rows 74, 78, 82, and 86 each include five keys 28, although in other embodiments the quantity of keys 28 potentially could be different. The arrangement in FIG. 1 of the linguistic elements 46 assigned to the keys 28 is exemplary, it being understood that the arrangement of the linguistic elements 46 assigned to the keys 28 can be different than that depicted in FIG. 1 without departing from the concept of the invention. It is further noted that in the exemplary layout of FIG. 1, each of the keys 28 in the first, second, and third rows 74, 78, and 82 have one or more linguistic elements 46 assigned thereto, and it is further noted that the exemplary depicted <FUNCTION> key 44 is assigned to a key 28 in the fourth row 86. As will be set forth in greater detail below, in other arrangements of the keypad 24 the <FUNCTION> key 44 may be assigned to a key 28 in the third row 82 or elsewhere without departing from the concept of the invention.

It can also be seen that the exemplary arrangement of the linguistic elements 46 assigned to the keys 28 is in the form of a QWERTY keyboard and, more specifically, in the form of a reduced QWERTY keyboard. It is understood that other arrangements of the linguistic elements 46 are possible, such as a DVORAK arrangement or other arrangement, either known or presently unknown, without departing from the concept of the invention.

The particular arrangement of the linguistic elements 46 assigned to the keys 28 can advantageously be selected on the basis of various considerations. For instance, it may be desirable to provide a relatively balanced layout of linguistic elements 46 across the keys 28 for purposes of convenience to the user and for facilitated data entry by the user. In such a situation, the balancing of linguistic elements 46 might be a general balancing of linguistic elements 46 on a first side of the keypad 24 with the linguistic elements 46 on a second side of the keypad 24 or other type of spatial or other balancing.

Another consideration may be to seek to provide one or more keys 28 in each of one or more of the first, second, and third rows 74, 78, and 82 with only a single linguistic element 46 assigned thereto. In such a situation, the single linguistic element 46 might provide to the user a conceptual or visual reference of a region of the keypad 24 to which it might be desirable to draw the user's attention such as, for example, a generally central region of the keypad 24 or other region of the keypad 24 to which it might be desirable to draw the user's attention.

Still another consideration may be to arrange the linguistic elements 46 on the keys 28 in such a fashion as to facilitate operation of the disambiguation routine 60. For instance, it may be determined in any of a number of ways that a combination of the linguistic elements 46 "S" and "D" assigned to the same key 28 may create substantial ambiguity depending upon the linguistic members 66 in the corpus 62. By way of example, certain of the linguistic members 66 in the corpus 62 may be the same in pertinent part as other of the linguistic members 66 except that one linguistic member 66 includes the linguistic element "S" while the other linguistic member 66 includes the linguistic element "D" at substantially the same location, such as in the example of the two exemplary linguistic members 66 "some" and "dome". It may be determined, for example, that a combination of the linguistic element 46 "S" with the linguistic element 46 "A" assigned to the same key 28 may create relatively less ambiguity than a combination in which the linguistic element 46 "S" is combined with the linguistic element 46 "D" assigned to the same key 28. Upon such a determination, the arrangement of linguistic elements 46 on the keypad 24 may be such that one of the keys 28 has assigned thereto the linguistic elements 46 "AS". Such a determination likely would turn on the content of linguistic members 66 in the corpus 62, which likewise would turn on the language or languages of the linguistic members 66, as well as other factors.

It is understood that these considerations and/or other considerations may be taken into account individually or in various combinations in determining the makeup of the arrangement of linguistic elements 46 on the keys 28. Various combinations of considerations may result in various different arrangements of the linguistic elements 46 on the keys 28.

For example, the first row 74 depicted generally in FIG. 1 includes five sequentially disposed keys 28, and the linguistic elements 46 assigned to the keys 28 of the first row 74 correspondingly sequentially are "QW", "ER", "TY", "UI", and "OP". It is understood that the arrangement of linguistic elements 46 on the five keys 28 of the first row 74 can be other than "QW", "ER", "TY", "UI", and "OP" without departing from the concept of the invention.

By way of further example, while the linguistic elements 46 assigned to the keys 28 of the second row 78 correspondingly sequentially are depicted in FIG. 1 as being "AS", "DF", "G", "HJ", and "KL", it is understood that the linguistic elements 46 assigned to the keys 28 of the second row 78 can correspondingly sequentially be any of, for instance:
  "A", "SD", "FG", "HJ", and "KL";
  "AS", "D", "FG", "HJ", and "KL";
  "AS", "DF", "G", "HJ", and "KL";
  "AS", "DF", "GH", "J", and "KL"; and
  "AS", "DF", "GH", "JK", and "L".

By way of still further example, while the linguistic elements 46 assigned to the keys 28 of the third row 82 are depicted in FIG. 1 as correspondingly sequentially being "ZX", "C", "V", "B", and "NM", it is understood that the linguistic elements 46 assigned to the keys 28 of the third row 82 can correspondingly sequentially be any of, for instance:
  "Z", "X", "C", "VB", and "NM";
  "Z", "X", "CV", "B", and "NM";
  "Z", "X", "CV", "B", and "NM";
  "Z", "X", "CV", "BN", and "M";
  "Z", "XC", "VB", "N", and "M";
  "Z", "XC", "VB", "N", and "M";
  "Z", "XC", "VB", "N", and "M";
  "ZX", "C", "V", "B", and "NM";
  "ZX", "C", "V", "BN", and "CM";
  "ZX", "C", "VB", "N", and "M"; and
  "ZX", "CV", "B", "N", and "M".

Moreover, as an alternative suggested above, one of the keys 28 of the third row 82 may be the exemplary depicted <FUNCTION> key 44. In such a situation, the linguistic elements 46 assigned to the keys 28 of the third row 82 can correspondingly sequentially be any of, for instance:
  "Z", "XC", "VB", and "NM", with the next sequentially disposed key 28 in the third row 82 being the <FUNCTION> key 44;
  "ZX", "C", "VB", and "NM", with the next sequentially disposed key 28 in the third row 82 being the <FUNCTION> key 44;
  "ZX", "CV", "B", and "NM", with the next sequentially disposed key 28 in the third row 82 being the <FUNCTION> key 44; and
  "ZX", "CV", "BN", and "M", with the next sequentially disposed key 28 in the third row 82 being the <FUNCTION> key 44.

Other arrangements of the linguistic elements 46 in each of the first, second, and third rows 74, 78, and 82 will be apparent.

It is noted that the first column 90 depicted generally in FIG. 1 can be said to comprise three of the keys 28 sequentially disposed, and that the second column 94 can be said to similarly comprise three of the keys 28 sequentially disposed. In the exemplary arrangement of the linguistic elements 46 of FIG. 1, the linguistic elements 46 assigned to the keys 28 of the first column 90 correspondingly sequentially comprise "Q", "A", and "Z", along with other linguistic elements 46. Moreover, in the exemplary arrangement of the linguistic elements 46 of FIG. 1, the linguistic elements 46 assigned to the keys 28 of the second column 94 correspondingly sequentially comprise "P", "L", and "M", along with other linguistic elements 46.

Figure 3:
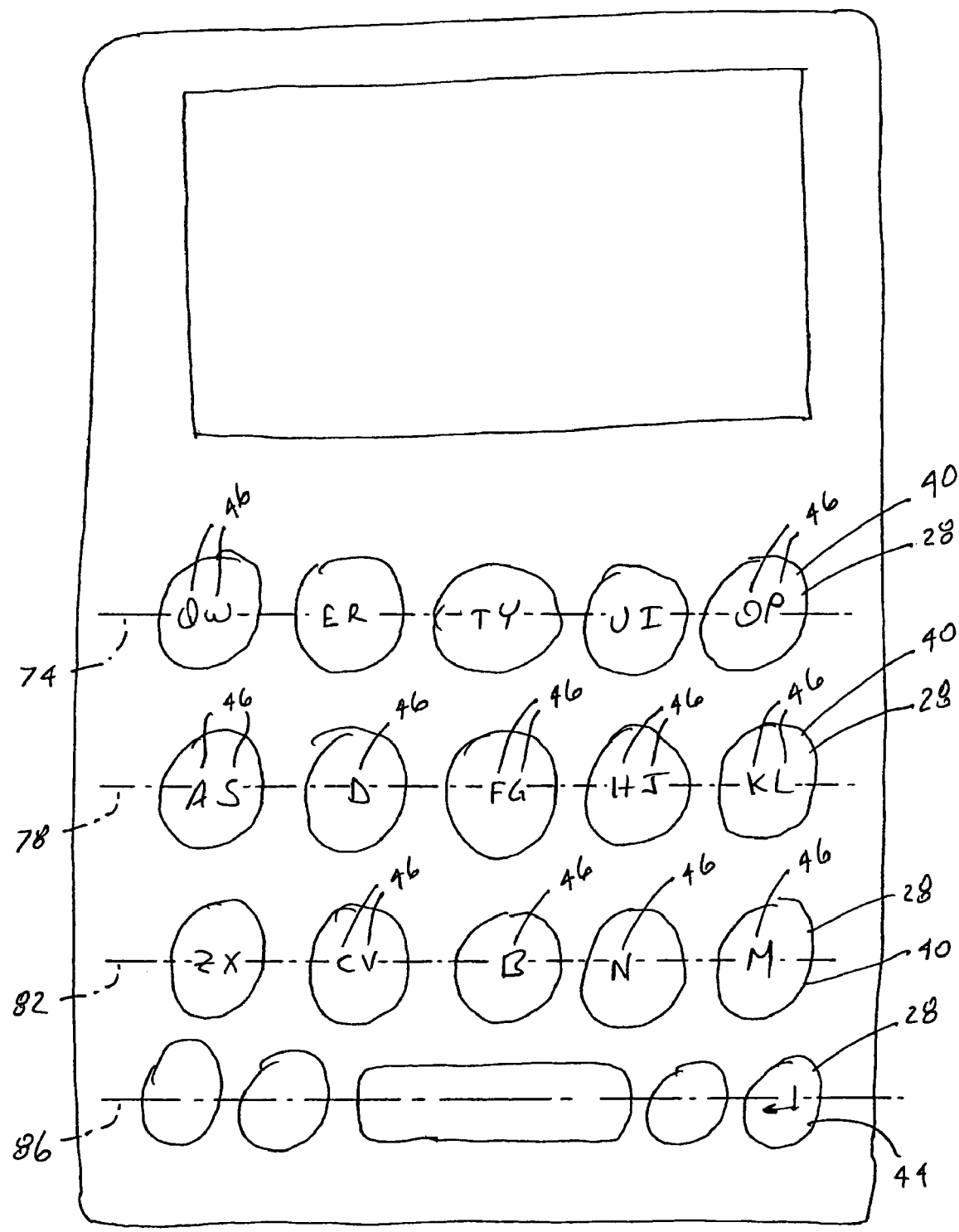
FIG. 3 is another exemplary top plan view of the handheld electronic device of FIG. 1, except having a different arrangement of linguistic elements on the keypad.

An exemplary alternate arrangement of the linguistic elements 46 on the keys 28 is depicted generally in FIG. 3. Such an arrangement of the linguistic elements 46 may result, for example, from a balancing of a plurality of considerations, such as the considerations of a balanced distribution of linguistic elements 46 in combination with the consideration of avoiding unnecessary ambiguity. Other arrangements will be apparent.

Figure 4:
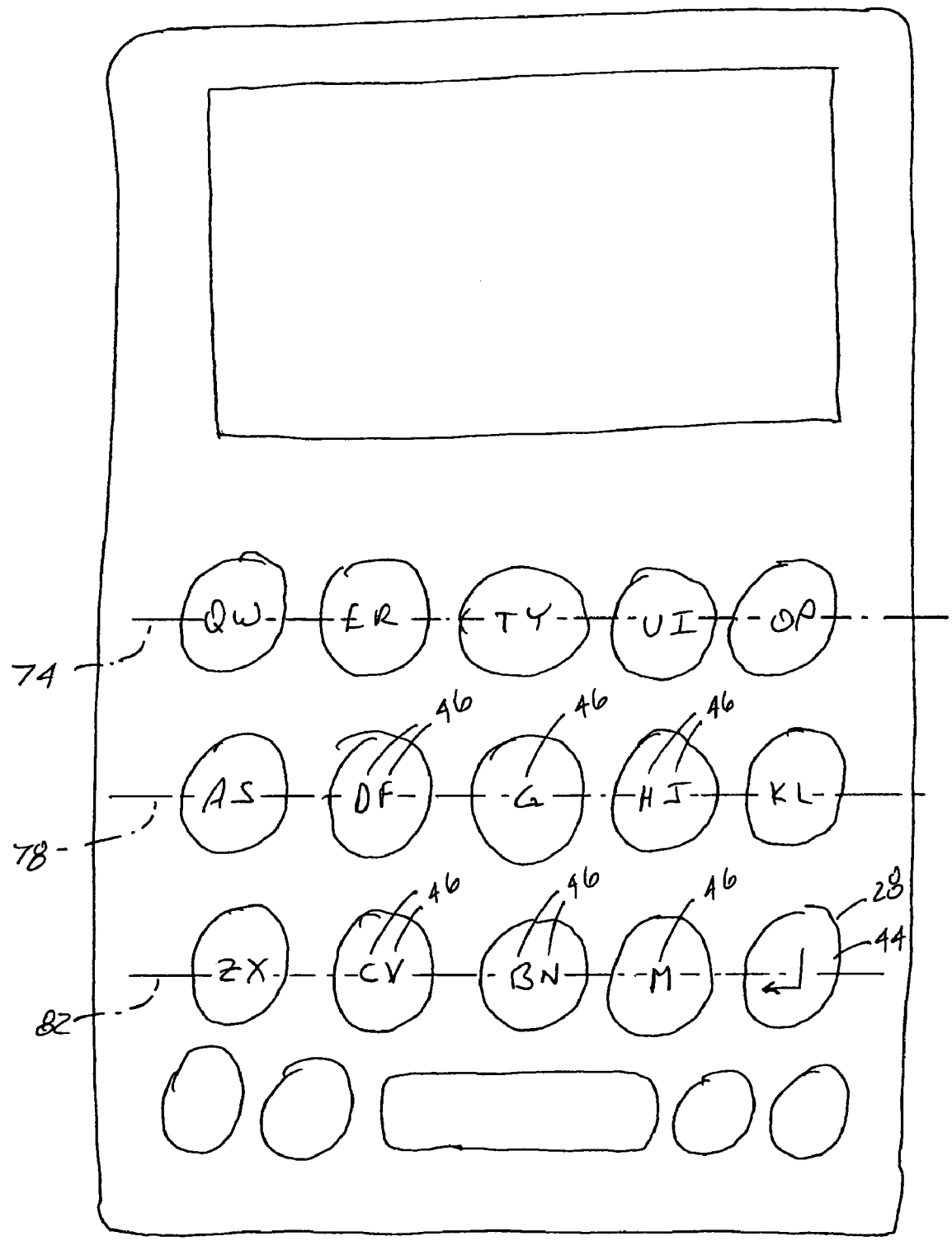
FIG. 4 is another exemplary top plan view of the handheld electronic device of FIG. 1, except having another different arrangement of linguistic elements on the keypad.

Another exemplary arrangement of the linguistic elements 46 on the keys 28 is depicted generally in FIG. 4. Such an arrangement of the linguistic elements 46 may result, for example, from the exemplary depicted <FUNCTION> key 44 being in the third row 82. Other arrangements will be apparent.

Advantageously, therefore, many different arrangements of the linguistic elements 46 on the keys 28 are possible. It is understood that many more arrangements than expressly depicted here are possible.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A keypad of a handheld electronic device comprising:
  a plurality of keys, at least a first portion of the keys of said plurality of keys being arranged generally in a plurality of rows, each row of at least a portion of said plurality of rows comprising a plural quantity of keys of said plurality of keys;

each key of at least a second portion of the keys of said at least a first portion of the keys having a number of linguistic elements assigned thereto, each key of at least a third portion of the keys of said at least a second portion of the keys having a plurality of linguistic elements assigned thereto;

the plurality of rows comprising a first row, a second row, and a third row, the second row being disposed between the first row and the third row;

the second row comprising a second plurality of sequentially disposed keys of the plurality of keys, the linguistic elements assigned to the second plurality of sequentially disposed keys correspondingly sequentially comprising one of:
"A", "SD", "FG", "HJ", and "KL";
"AS", "D", "FG", "HJ", and "KL";
"AS", "DF", "G", "HJ", and "KL";
"AS", "DF", "GH", "J", and "KL"; and
"AS", "DF", "GH", "JK", and "L";

the third row comprising a third plurality of sequentially disposed keys of the plurality of keys, the linguistic elements assigned to the third plurality of seqentially disposed keys correspondingly sequentially comprising one of:
"ZX", "C", "VB", and "NM", with the next sequentially disposed key in the third row being a <FUNCTION> key;
"ZX", "CV", "B", and "NM", with the next sequentially disposed key in the third row being a <FUNCTION> key;
"Z", "X", "C", "VB", and "NM";
"Z", "X", "CV", "B", and "NM";
"Z", "X", "CV", "BN", and "M";
"Z", "XC", "V", "B", and "NM";
"Z", "XC", "V", "BN", and "M";
"Z", "XC", "VB", "N", and "M";
"ZX", "C", "V", "B", and "NM";
"ZX", "C", "V", "BN", and "M";
"ZX", "C", "VB", "N", and "M";
"ZX", "CV", "B", "N", and "M".

wherein said plurality of keys are arranged generally in a plurality of columns, each column of at least a portion of said plurality of columns comprising a plural quantity of keys of said plurality of keys;

the plurality of columns comprising a first column and a second column;

the first column comprising a first plurality of sequentially disposed keys of the plurality of keys, the linguistic elements assigned to the first plurality of sequentially disposed keys correspondingly sequentially comprising "Q", "A", and "Z"; and the second column comprising a second plurality of sequentially disposed keys of the plurality of keys, the linguistic elements assigned to the second plurality of sequentially disposed keys correspondingly sequentially comprising "P", "L", and "M".

2. The keypad of claim 1 wherein the first row comprises a first plurality of sequentially disposed keys of the plurality of keys, the linguistic elements assigned to the first plurality of sequentially disposed keys correspondingly sequentially comprising "QW", "ER", "TY", "UI", and "OP".

3. A handheld electronic device comprising the keypad of claim 1, and further comprising:
a processor apparatus including a processor and a memory;
an output apparatus;
the processor apparatus being adapted to receive input from the keypad and to provide output to the output apparatus;
the memory including a corpus of linguistic members and a number of routines stored therein, each linguistic member of at least a portion of the plurality of linguistic members comprising a number of the linguistic elements;
the plurality of routines comprising a disambiguation routine, responsive to an actuation by a user of a key from among the third portion of the keys, the disambiguation routine being adapted to output to the output apparatus a linguistic element from among the plural quantity of linguistic elements assigned to said key as a disambiguated interpretation of an intent of the user in the actuation of said key.

* * * * *